(12) United States Patent
Jensen

(10) Patent No.: US 8,038,174 B2
(45) Date of Patent: Oct. 18, 2011

(54) APPARATUS FOR REPAIRING A CORE SPRAY DOWNCOMER PIPE SLIP JOINT COUPLING

(75) Inventor: Grant Clark Jensen, Morgan Hill, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 371 days.

(21) Appl. No.: 12/222,427

(22) Filed: Aug. 8, 2008

(65) Prior Publication Data

US 2010/0032938 A1 Feb. 11, 2010

(51) Int. Cl.
*F16L 55/18* (2006.01)
*F16L 21/06* (2006.01)

(52) U.S. Cl. ............ 285/15; 285/367; 285/419; 138/97

(58) Field of Classification Search ............ 285/15, 285/367, 373, 412, 419; 411/122, 125, 128; 138/97
See application file for complete search history.

(56) References Cited

U.S. PATENT DOCUMENTS

| | | | | |
|---|---|---|---|---|
| 1,071,424 A | * | 8/1913 | Hughes | 81/97 |
| 3,003,793 A | * | 10/1961 | Pitt | 285/112 |
| 4,927,181 A | * | 5/1990 | Ciotola | 285/15 |
| 5,080,400 A | * | 1/1992 | Adamek et al. | 285/23 |
| 5,118,139 A | * | 6/1992 | Lott | 285/15 |
| 5,188,397 A | * | 2/1993 | Hynes | 285/24 |
| RE35,533 E | * | 6/1997 | Adamek et al. | 285/23 |
| 5,839,192 A | | 11/1998 | Weems | |
| 5,853,030 A | * | 12/1998 | Walding | 138/99 |
| 5,899,506 A | * | 5/1999 | Tseeng | 285/148.23 |
| 5,947,529 A | | 9/1999 | Jensen | |
| 6,108,391 A | * | 8/2000 | Deaver et al. | 376/262 |
| 6,131,962 A | | 10/2000 | Jensen | |
| 6,421,406 B1 | * | 7/2002 | Jensen | 376/352 |
| 7,198,465 B1 | * | 4/2007 | Ichiryu | 415/214.1 |
| 7,617,963 B1 | * | 11/2009 | Jensen | 228/44.5 |
| 7,802,825 B2 | * | 9/2010 | Jensen | 285/419 |
| 2004/0227347 A1 | * | 11/2004 | Fundin et al. | 285/419 |
| 2007/0189434 A1 | | 8/2007 | Jensen | |
| 2007/0296213 A1 | * | 12/2007 | Jones et al. | 285/421 |
| 2008/0144761 A1 | | 6/2008 | Jensen | |

FOREIGN PATENT DOCUMENTS

WO 2008/065364 6/2008

OTHER PUBLICATIONS

Extended European Search Report for corresponding European Patent Application No. EP 09 16 7147 (Completion Date: Nov. 12, 2009).

* cited by examiner

*Primary Examiner* — James Hewitt
(74) *Attorney, Agent, or Firm* — Nixon & Vanderhye, P.C

(57) ABSTRACT

A slip joint clamp is disclosed which structurally replaces cracked welded joints in the core spray downcomer slip joint coupling, which is part of the lower portion of internal core spray piping internal to a reactor vessel of a Boiling Water Reactor plant. The internal piping delivers core spray cooling water to the reactor core region. The clamp assembly consists of a primary clamp housing and a secondary clamp housing, which are rotationally joined together by a hinge assembly including a hinge pin. The clamp assembly is installed at a desired elevation relative to the downcomer slip joint, and then secured to the downcomer piping by installing coupling bolts and associated coupling bolt keeper nuts that hold the primary and secondary clamp housings in a facing relationship to one another around the downcomer slip joint.

19 Claims, 10 Drawing Sheets

US 8,038,174 B2

APPARATUS FOR REPAIRING A CORE SPRAY DOWNCOMER PIPE SLIP JOINT COUPLING

The present invention relates to core spray piping systems in operating boiling water reactors (BWRs), and more particularly to a repair device for structurally replacing cracked welded joints in the core spray downcomer pipe slip joint coupling.

BACKGROUND OF THE INVENTION

Common to most operating BWR's, the core spray cooling water is delivered to the reactor core region by piping internal to the reactor vessel. The core spray piping systems in operating BWR's are of welded construction. The welds in the original core spray system piping are susceptible to Intergranular Stress Corrosion Cracking (IGSCC).

The lower portion of BWR's internal core spray piping is commonly referred to as the "downcomer piping". There are a total of four vertical downcomer pipes, which supply cooling water to sparger piping interior to the shroud 14. Two of these downcomer pipes 10 located on one side of the shroud 14 are shown in FIG. 1. Each of the downcomer pipes 10 consists of two separate vertical piping segments 16 and 18, which are joined together at the time of reactor vessel assembly by a slip joint coupling 20, as shown in cross-sectional view in FIG. 2. The lower segment 18 of the downcomer 10 incorporates a receptacle 22, which is welded in the shop to the lower vertical segment 18 of piping by virtue of a P7 weld. During reactor vessel assembly, the upper piping segment 16 of the downcomer is trimmed in length to mate with the lower segment 18. A sleeve 24, which slides on the upper downcomer piping segment 16 is then inserted into the receptacle 22, thereby covering a joint 26 between the upper and lower piping segments 16 and 18. Circumferential fillet welds, P5 and P6, are then applied to seal the slip joint 26 with the upper downcomer piping segment 16 and receptacle 22, respectively. It is worthy to note that even though separate downcomer pipes may penetrate the shroud 14 at different elevations, typically, the slip joint couplings 20 are all located at the same elevation in a reactor vessel 12.

In the event that cracking should occur in any one of the three slip joint coupling welds P5, P6 and/or P7, the structural integrity of the downcomer slip joint coupling 20 would be lost. A preemptive repair would be to install a clamping device, which would prevent separation of the downcomer slip joint coupling in the event that circumferential through-wall cracking should occur. The present invention is directed to a remotely installed repair device, which structurally replaces cracked welded joints in the core spray downcomer slip joint coupling.

BRIEF DESCRIPTION OF THE INVENTION

In an exemplary embodiment of the invention, a clamping device for supporting or structurally replacing a cracked weld joint between connected pipes comprises an primary clamp housing, a secondary clamp housing, a hinge assembly rotationally joining together the primary and secondary clamp housings, at least one coupling bolt and at least one coupling bolt keeper nut joined together to connect the primary and secondary clamp housings together and thereby secure the primary and secondary clamp housings on opposite sides of the connected pipes in facing relation, the at least one coupling bolt extending through portions of the connected primary and secondary clamp housings not engaging the connected pipes, at least first and second lateral pins inserted into the primary and secondary clamp housings, respectively, the at least first and second lateral pins being seated in corresponding conical holes machined in the connected pipes, and at least first and second lateral pin keepers corresponding to the at least first and second lateral pins, the at least first and second lateral pin keepers being located on the primary and secondary clamp housings, respectively, a portion of each of the at least first and second lateral pins engaging a complementary portion of the at least first and second lateral pin keepers, respectively, so as to prevent rotation of the at least first and second lateral pins and thereby retain a preload on each of the at least first and second lateral pins.

In another exemplary embodiment of the invention, a clamping device for supporting or structurally replacing a cracked weld between connected pipes in a core spray line in a boiling water nuclear reactor comprises a primary clamp housing including a first curved portion, a secondary clamp housing including a second curved portion, a hinge assembly rotationally joining together the primary and secondary clamp housings, at least one coupling bolt and at least one coupling bolt keeper nut connecting the primary and secondary clamp housings together so as to secure the primary and secondary clamp housings on opposite sides of the spray line connected pipes in facing relation, the at least one coupling bolt extending through extensions of the connected primary and secondary clamp housings, at least one first lateral pin inserted into the first curved portion of the primary clamp housing, a distal end of the at least one first lateral pin seating into a first conical hole machined in the spray line connected pipes, at least one first lateral pin keeper positioned on the primary clamp housing engaging the at least one first lateral pin, at least one second lateral pin inserted into the second curved portion of the secondary clamp housing, a distal end of the at least one second lateral pin seating into a second hole machined in the spray line connected pipes, and at least one second lateral pin keeper positioned on the secondary clamp housing engaging the at least one second lateral pin, the first and second lateral pins each including ratchet teeth that interface with corresponding teeth of the first and second lateral pin keepers, respectively, to prevent rotation of the first and second lateral pins to thereby retain preloads on the first and second lateral pins.

In a further exemplary embodiment of the invention, a method of supporting or structurally replacing a cracked weld joint between connected pipes using a clamping device comprises the steps of providing a primary clamp housing with a first extension, providing a secondary clamp housing with a second extension, providing a hinge assembly, joining the primary and secondary clamp housings together on a first side using the hinge assembly, inserting at least one coupling bolt through the first and second extensions of the primary and secondary clamp housings, joining the primary and secondary clamp housings together on a second side corresponding to the first and second extensions by mating the at least one coupling bolt with at least one corresponding coupling bolt keeper nut to thereby secure the primary and secondary clamp housings on opposite sides of the connected pipes in facing relation, forming at least one first hole in the connected pipes in an area encompassing the cracked weld joint using the primary clamp housing as a guide, forming at least one second hole in the connected pipes in an area encompassing the cracked weld joint using the secondary clamp housing as a guide, inserting at least one first lateral pin into a curved portion of the primary clamp housing so that the at least one first lateral pin seats into the first hole formed in the pipe, inserting at least one second lateral pin into a curved portion of the secondary clamp housing so that the at least one second lateral pin seats into the second hole formed in the pipe, providing on the curved portion of the primary clamp housing at least one first lateral pin keeper corresponding to the at least one first lateral pin, providing on the curved portion of the secondary clamp housing at least one second lateral pin keeper corresponding to the at least one second lateral pin, the at least one first and second lateral pins each having teeth that interface with complementary teeth of the at least one first and second lateral pin keepers so as to prevent rotation of the at least one first and second lateral pins to thereby retain preloads on the at least one first and second lateral pins.

DETAILED DESCRIPTION OF THE INVENTION

The present invention is directed to a clamp, which structurally replaces cracked core spray downcomer slip joint welds. More specifically, the present invention is directed to a slip joint clamp for repairing cracked downcomer slip joint welds in Boiling Water Reactor plants with varying sized downcomer pipes.

Figure 3:
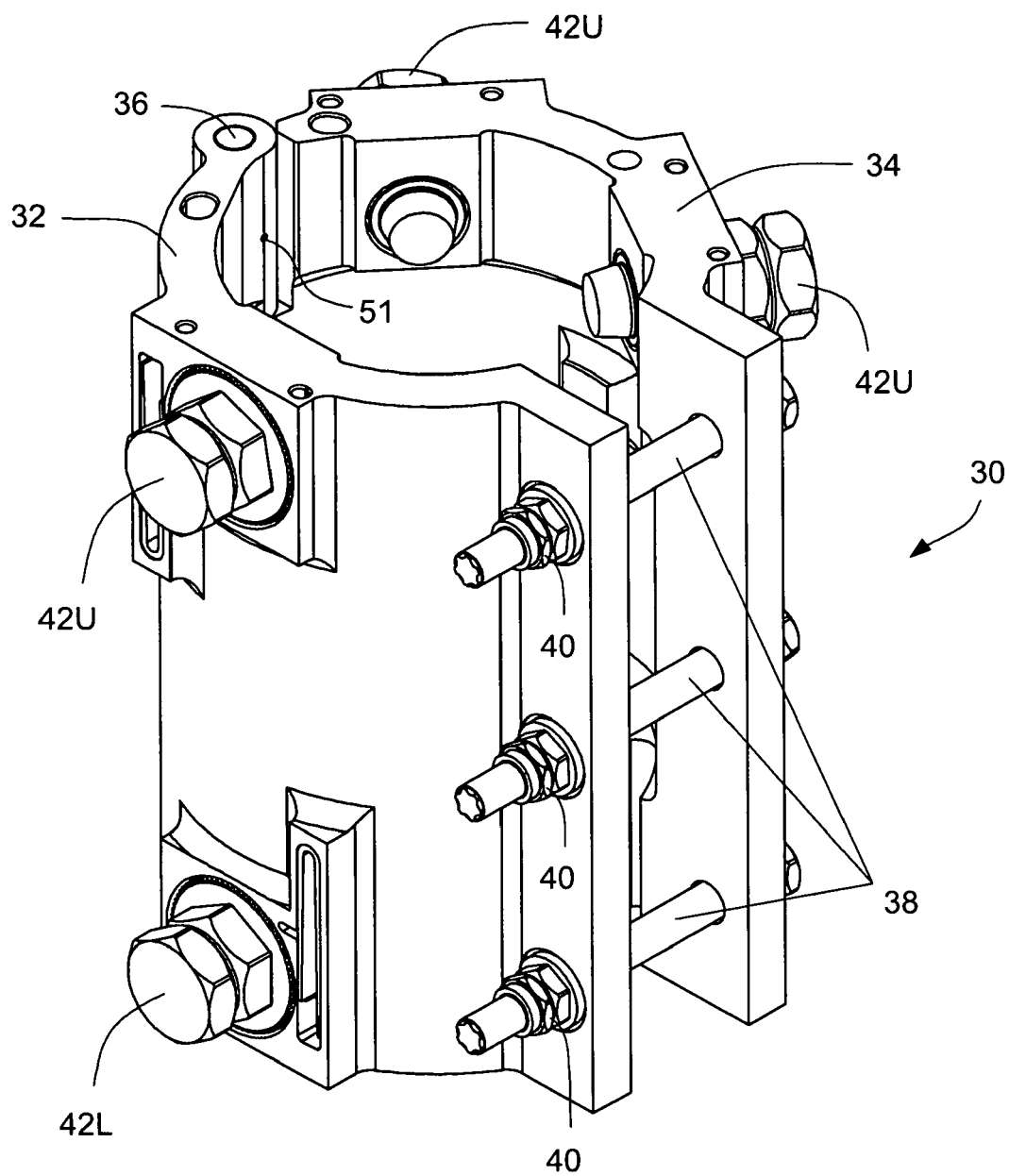
FIG. 3 is an isometric view of the slip joint clamp assembly.
Figure 19:
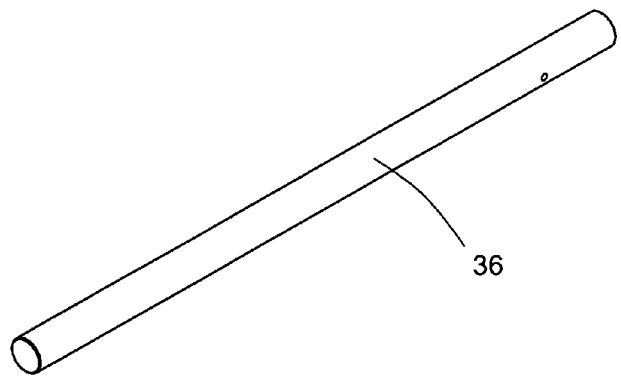
FIG. 19 is an isometric view of a hinge pin.

One embodiment of a slip joint clamp assembly 30 is shown in isometric representation in FIG. 3. The clamp assembly 30 includes a primary clamp housing 32 and a secondary clamp housing 34, which are rotationally joined together by a hinge assembly including a hinge pin 36 inserted through a plurality of hinge knuckles 46 attached to primary and secondary clamp housings 32 and 34. One embodiment of the hinge pin 36, which joins the primary and secondary clamp housings 32 and 34 together, is shown in FIG. 19.

The design of the primary and secondary clamp housings 32 and 34 are similar, as can be seen from FIGS. 10 through 13. The primary clamp housing 32 includes a curved portion 33 to which are attached preferably three hinge knuckles 46, and within which are located preferably two contact pads 48 and two bumper pads 50. The secondary clamp housing 34 also includes a curved portion 35 to which are attached preferably two hinge knuckles 46, and within which are located preferably one contact pad 48 and one bumper pad 50. One other feature unique to the primary housing 32 is a pilot hole 51 drilled in one hinge knuckle 46 of the housing. This pilot hole is provided for the installation of a dowel pin (not shown), which is installed at assembly and functions to maintain the hinge pin 36 captive to the clamp assembly 30. The contact pads 48 of the primary and secondary housings 32 and 34 interface with the lower piping segment 18 of the downcomer pipe 10. These three contact pads 48 are machined with a nominal radius of curvature, so as to interface with the outside surface of the downcomer pipe 10 in a stable manner, as shown in FIG. 8.

The installation of the clamp assembly 30 over a cracked slip joint weld is simplified by using a specialized tooling fixture (not shown). This tooling assists in locating the clamp assembly 30 at the desired elevation relative to the downcomer slip joint 20. The clamp assembly 30 is then secured to the downcomer piping by installing a plurality of coupling bolts 38 through bolt extensions 41 and 43 on the sides of primary and secondary clamp housings 32 and 34, and then securing the bolts 38 in place with a corresponding plurality of associated coupling bolt keeper nuts 40. It should be noted that bolt extensions 41 and 43 extend from sides of primary and secondary clamp housings 32 and 34 that are opposite those from which hinge knuckles 46 extend.

Figure 4:
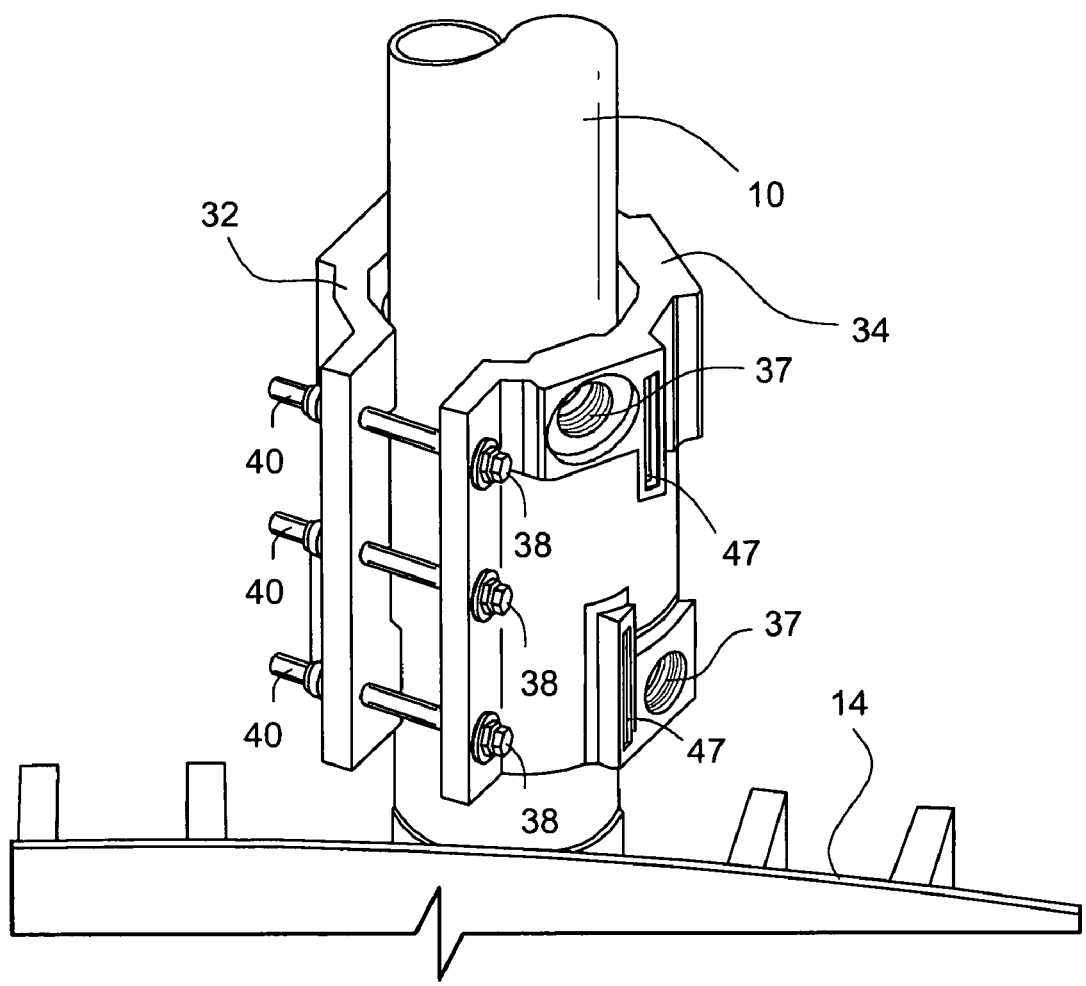
FIG. 4 is an isometric view of the slip joint clamp assembly installed on downcomer piping.
Figure 5:
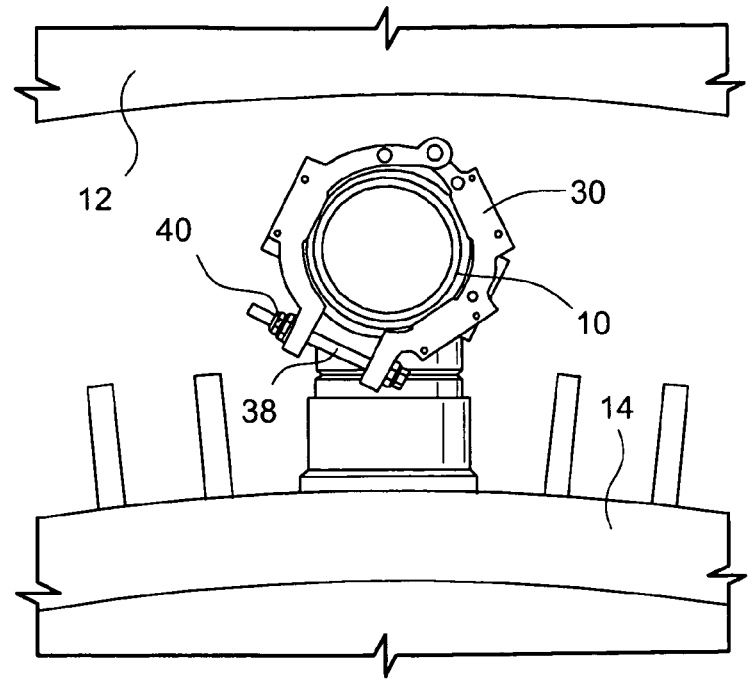
FIG. 5 is a plan view of the slip joint clamp assembly installed on downcomer piping.
Figure 6:
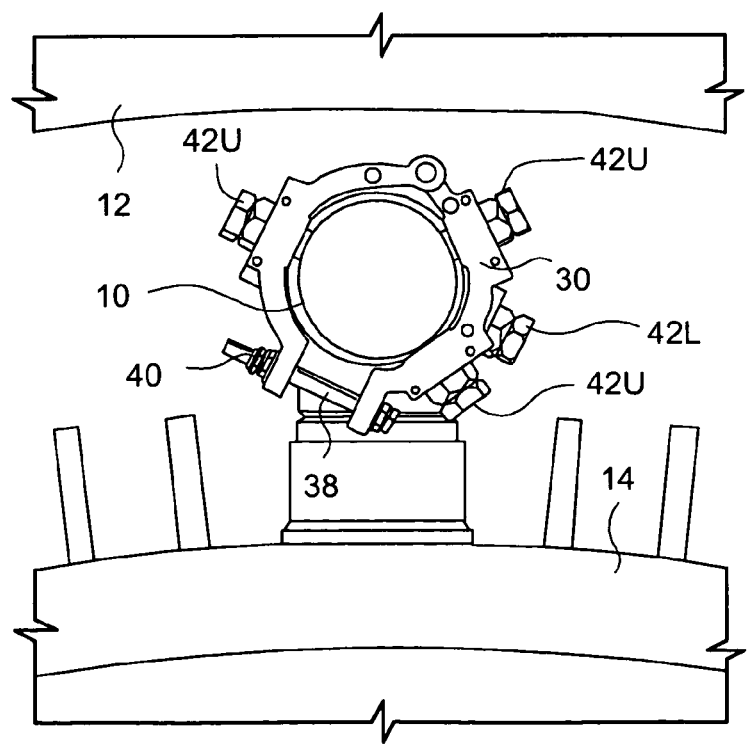
FIG. 6 is a plan view of the lateral pins installed in the clamp assembly.
Figure 7:
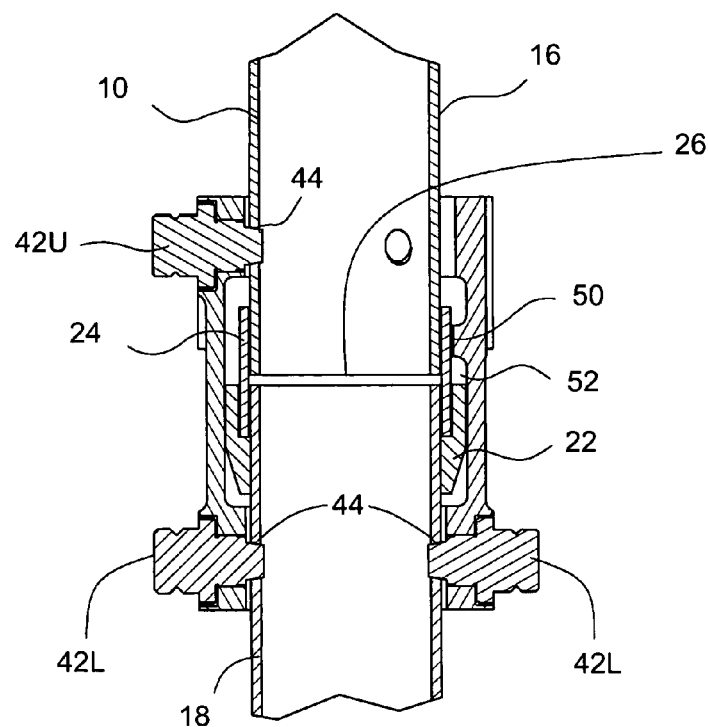
FIG. 7 is a cross-sectional view of the lateral pins installed in the clamp assembly.

The installation orientation of clamp assembly 30 on the downcomer pipe 10 is shown in FIGS. 4, 5 and 6. With clamp assembly 30 properly positioned, five conical holes 44 are machined into the downcomer pipe 10 (FIGS. 7-9). This machining operation is accomplished by fixturing an electric discharge machining ("EDM") actuator (not shown) separately with each of the five apertures provided to receive the lateral pins 42 in the primary and secondary clamp housings 32 and 34. This ensures that the resulting machined holes 44 are located exactly in the intended locations for five lateral pins 42, which interface with the downcomer piping 10. These conical holes are machined with an included angle of 20 degrees and are machined to a specified depth. Once the hole machining operation is completed, the lateral pins 42 are installed and seated in the conical holes 44 of the downcomer piping 10. The clamp assembly 30 is initially installed without the five lateral pins 42 being inserted in assembly 30, as shown in FIGS. 4 and 5. The rotational orientation shown in these figures provides equidistant accessibility to the two upper lateral pin locations nearest the reactor vessel wall 12. The use of the lateral pins 42 minimizes the potential leakage of core spray coolant and also provides the necessary structure to prevent downcomer separation under all postulated normal, upset, emergency and faulted events. The proper seating of the lateral pins 42 is readily apparent in the cross-sectional views of FIGS. 7 through 9.

Figure 8:
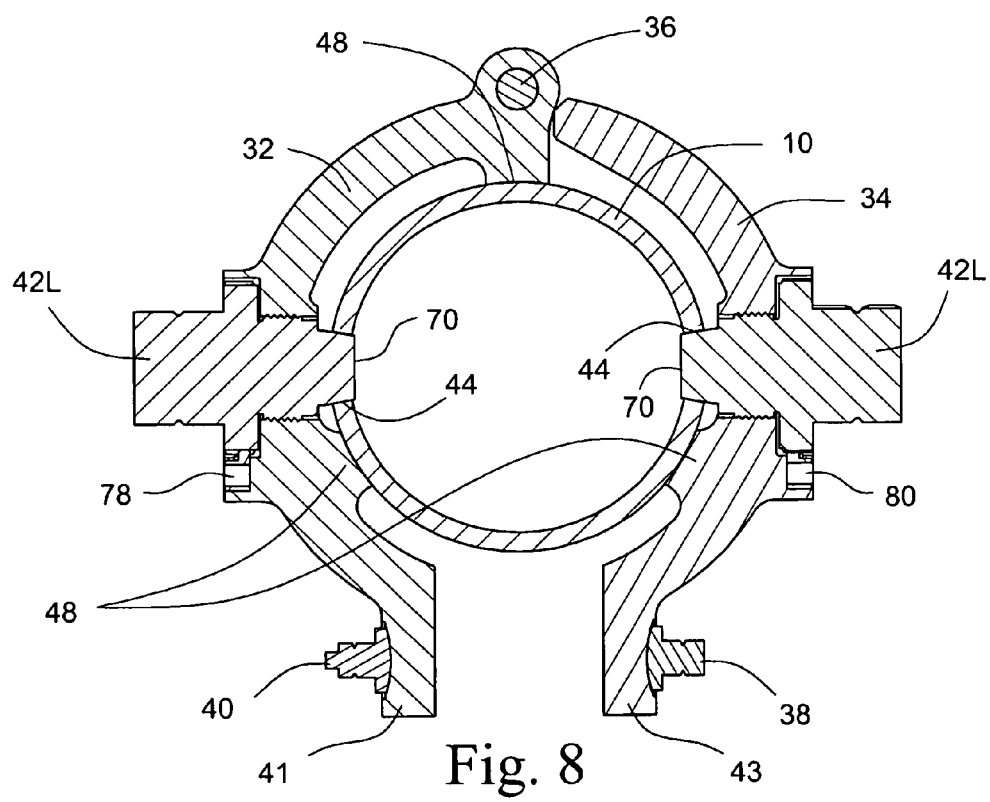
FIG. 8 is a cross-sectional view of the lower lateral pins installed in the clamp assembly.
Figure 9:
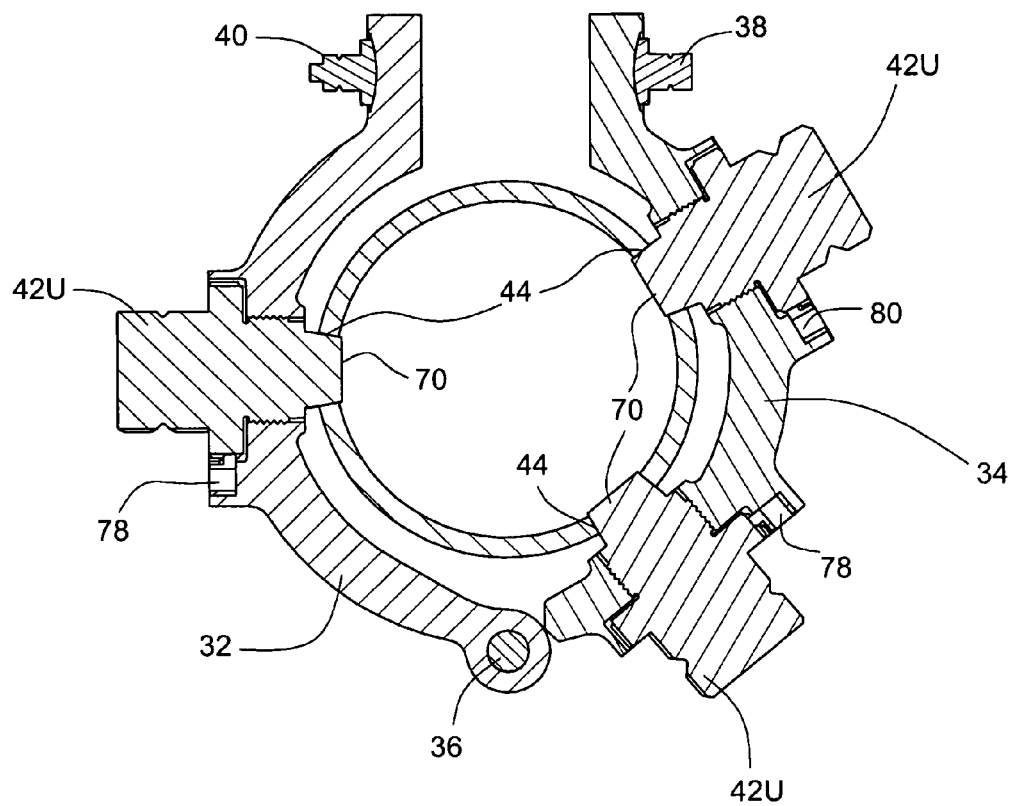
FIG. 9 is a cross-sectional view of upper lateral pins installed in the clamp assembly.
Figure 10:
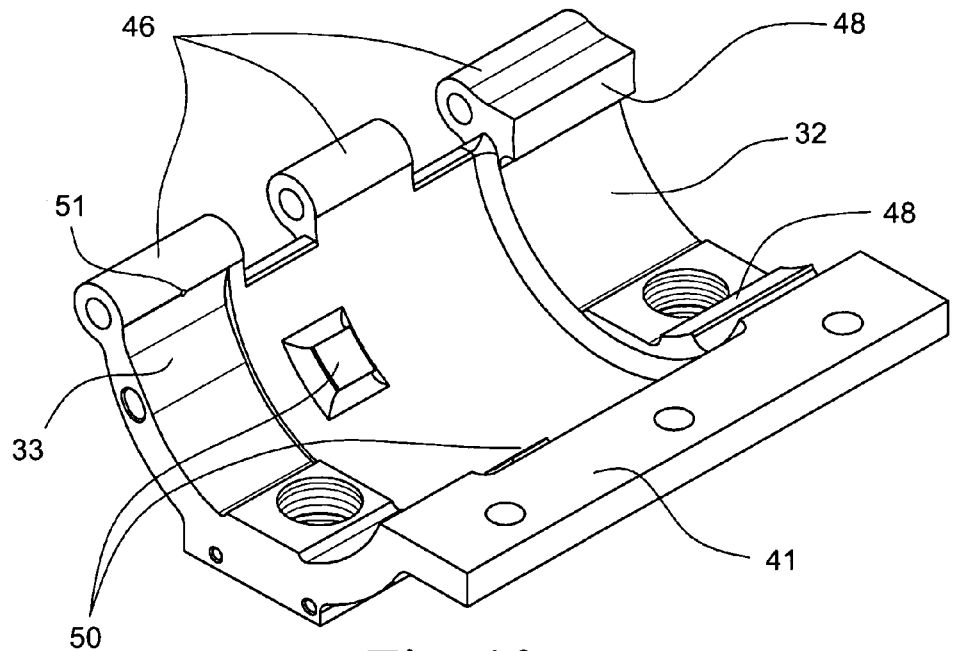
FIG. 10 is an isometric view of the inside of the primary clamp housing.

The two lower lateral pins 42L, when installed, interface with the lower segment 18 of the downcomer piping 10, as shown in FIG. 8. This prevents relative axial movement between the clamp assembly 30 and the lower downcomer piping segment 18. The other three upper lateral pins 42U, when installed, interface with the upper segment 16 of the downcomer piping 10, as shown in FIG. 9. These upper lateral pins 42U serve two purposes. First, they prevent relative axial movement between the clamp assembly 30 and the upper downcomer piping segment 16, which coupled with the lower lateral pins 42L, prevent axial separation of the upper and lower downcomer piping segments 16 and 18. Secondly, upper lateral pins 42U provide lateral support to the upper downcomer piping segment 16.

Figure 1:
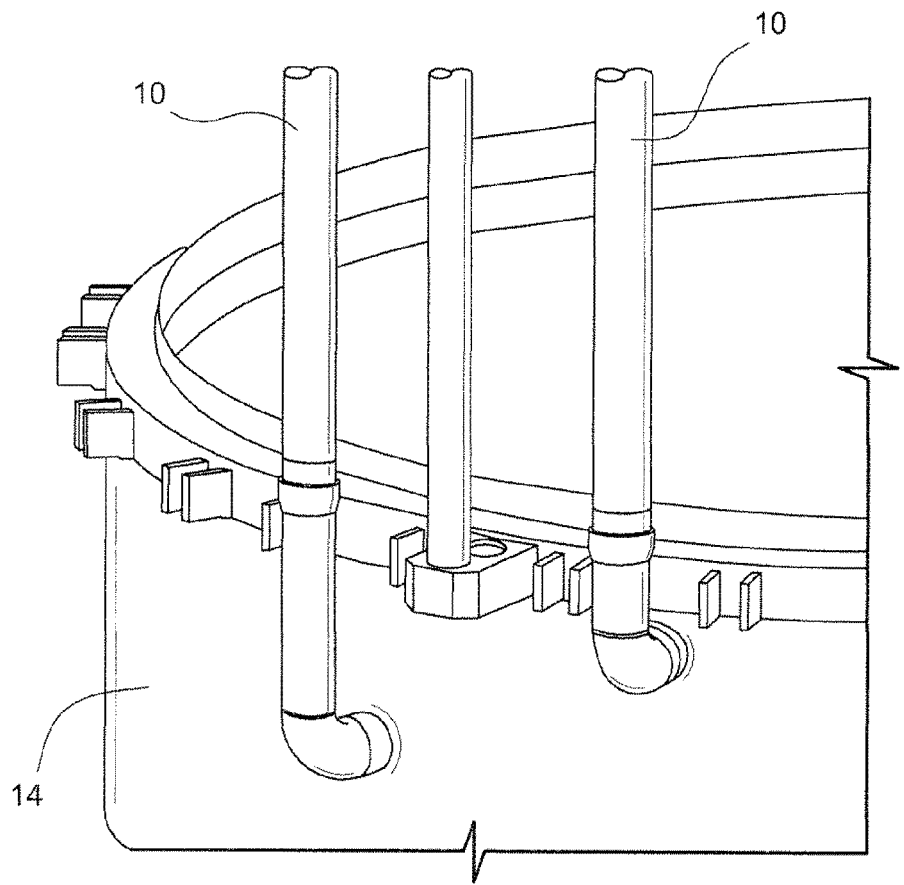
FIG. 1 is an isometric view of downcomer piping.
Figure 2:
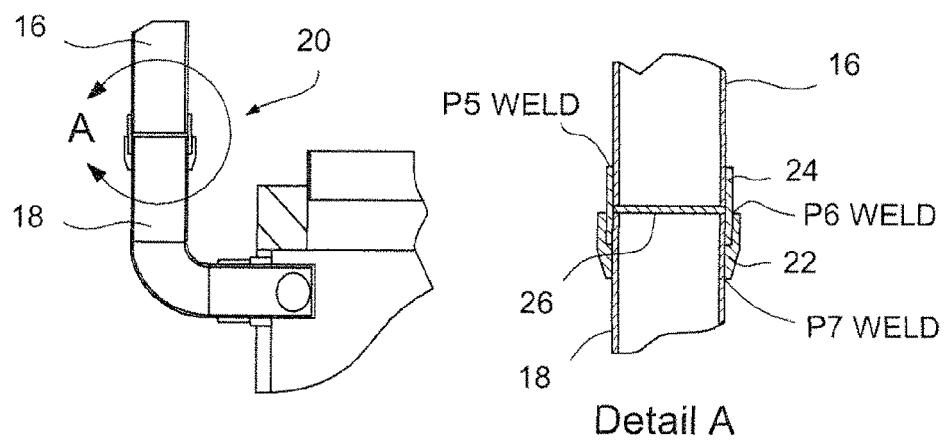
FIG. 2 is a cross-sectional view of downcomer piping.

Bumper pads 50 are incorporated into the design of the primary and secondary clamp housings 32 and 34. In the unlikely event of circumferential weld failure of the P5 and P6 welds referenced to in FIG. 2, a cylindrical segment of the core spray downcomer piping could become separated and thus become a loose part in the core spray downcomer flowstream. The bumper pads 50 of the primary and secondary clamp housings 32 and 34 are strategically located to limit lateral movement of this piping segment. A small radial gap 52 (FIG. 7) must be provided between the bumper pad 50 and the downcomer piping 10, thus allowing for potential misalignment of the upper and lower downcomer piping segments 16 and 18.

Figure 14:
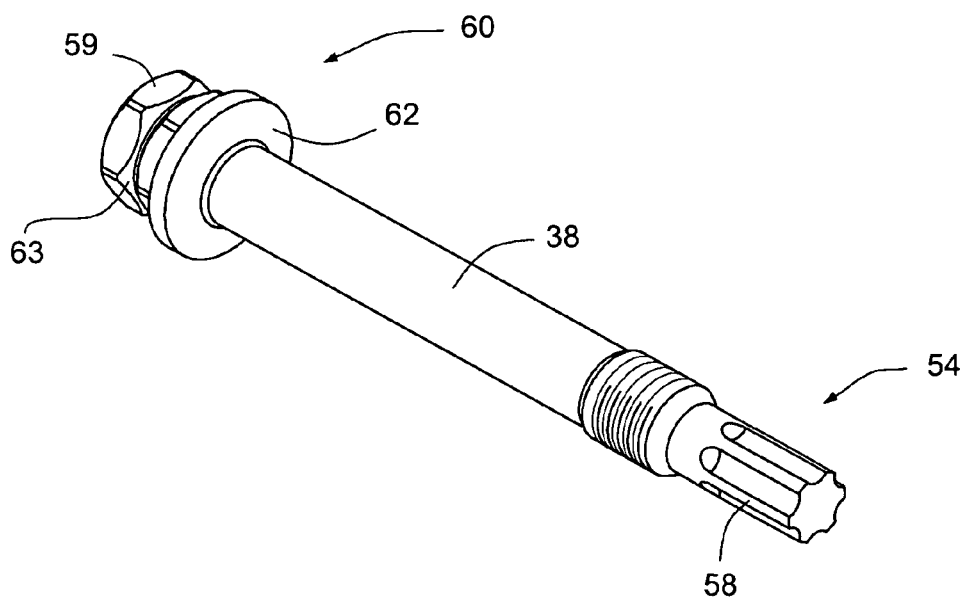
FIG. 14 is an isometric view of a coupling bolt.
Figure 15:
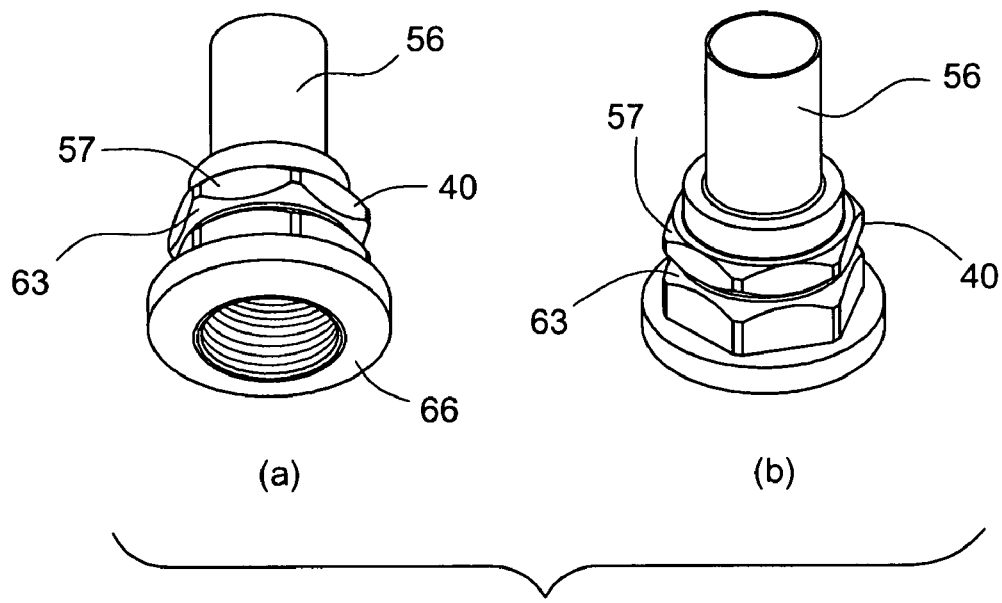
FIGS. 15(a) and (b) are isometric views of a coupling bolt keeper nut.

Three coupling bolts 38 and associated coupling bolt keeper nuts 40 provide a mechanical preload or clamping force between the primary and secondary clamp housings 32 and 34. These coupling bolts 38 and coupling bolt keeper nuts 40 are shown respectively in FIGS. 14 and 15. The distal end 54 of the coupling bolt 38 is machined to a diameter slightly smaller than the inside diameter of a cylindrical thin-walled crimp collar 56 of the coupling bolt keeper nut 40, and is machined with a plurality of flutes 58, which interface with the crimp collar 56 of the coupling bolt keeper nut 40. The proximal end 60 of the coupling bolt incorporates a spherical seating surface 62, which interfaces with a similar spherical seating surface 64 of the secondary clamp housing 34. The design of the coupling bolt keeper nut 40 also incorporates a spherical seating surface 66, which interfaces with the mating spherical seating surface 68 of the primary clamp housing 32. These spherical seating surfaces, 62, 64, 66, and 68, alleviate any bending stresses in the mechanically preloaded coupling bolts 38. In addition, the thin-walled cylindrical crimp collar 56 is provided in the design of the coupling bolt keeper nut 40 so that, once the proper mechanical preload is applied to the coupling bolt during clamp installation, the crimp collars 56 of the coupling bolt keeper nuts 40 are deformed mechanically over the fluted ends 58 of the coupling bolts 38, thus preventing any relative rotational movement between these two components in the flow induced vibration environment of an operating reactor.

Figure 11:
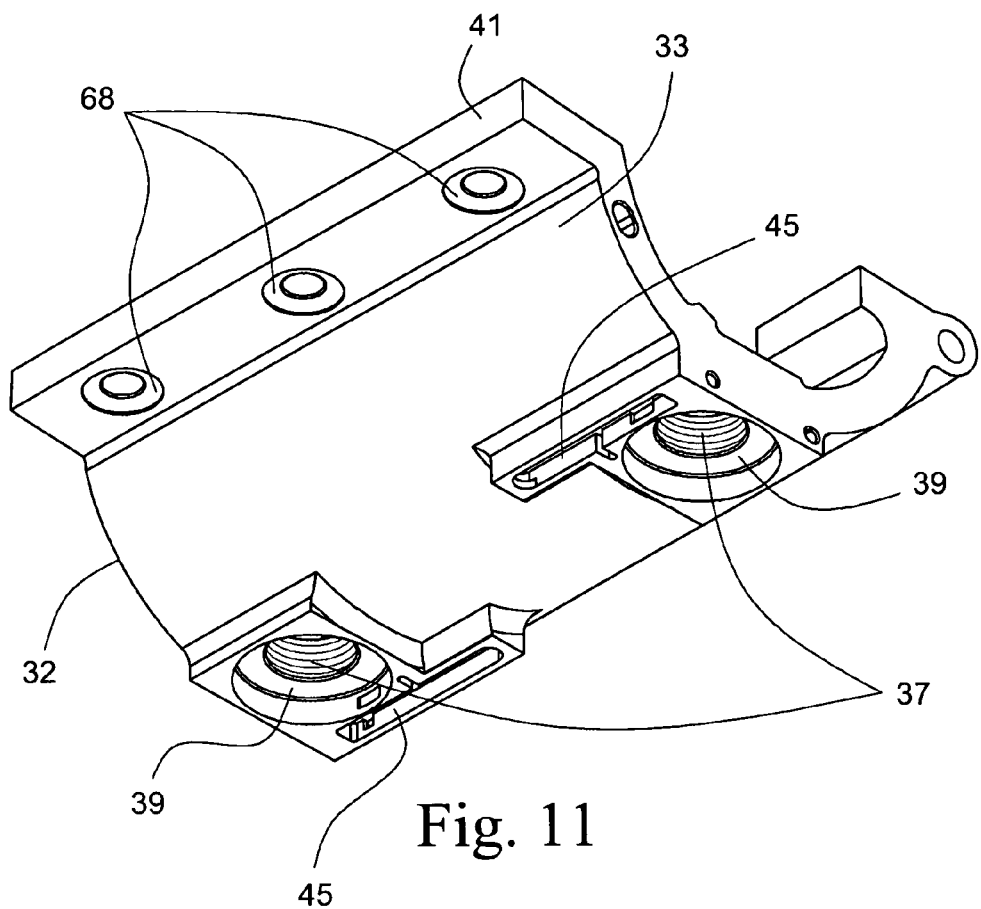
FIG. 11 is an isometric view of the outside of the primary clamp housing.
Figure 12:
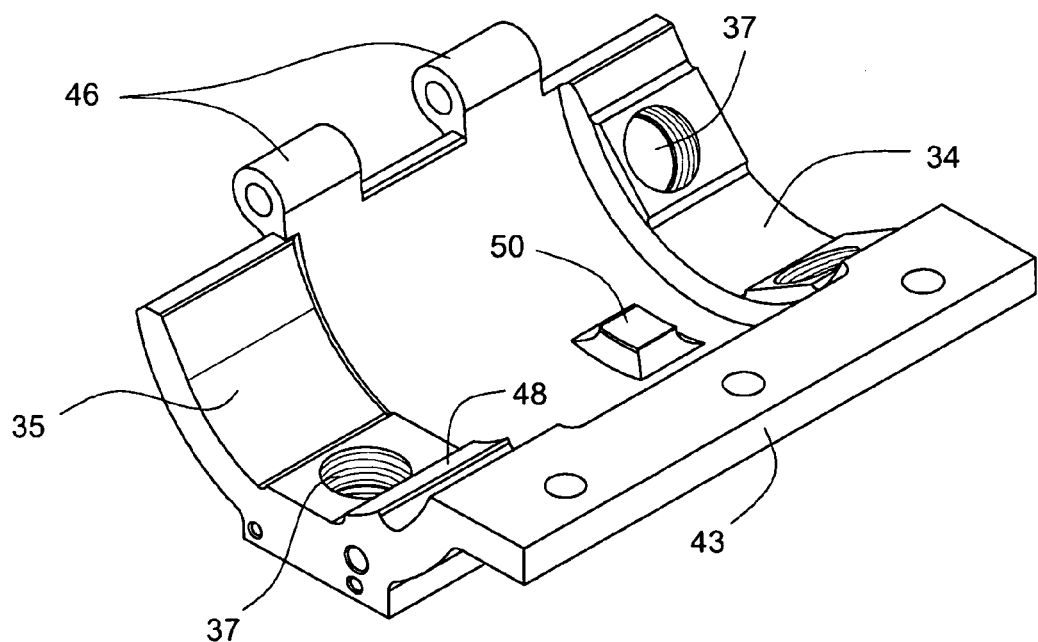
FIG. 12 is an isometric view of the inside of the secondary clamp housing.
Figure 13:
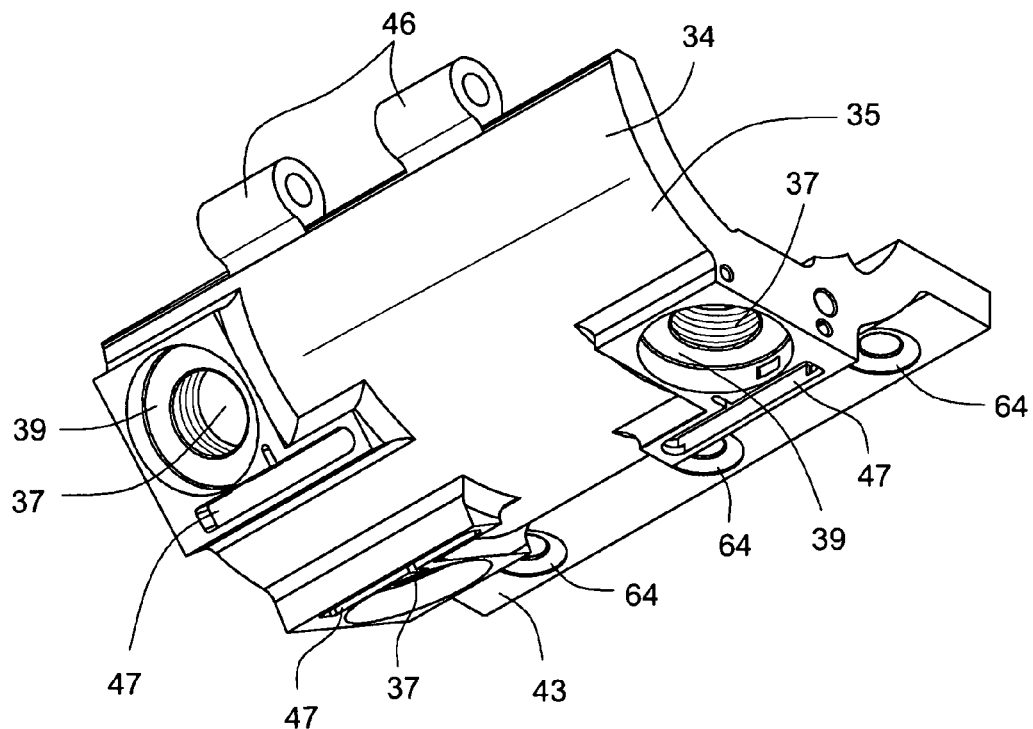
FIG. 13 is an isometric view of the outside of the secondary clamp housing.

As shown in FIG. 11, the primary clamp housing 32 also includes two holes 37 through which two lateral pins 42 are inserted, as shown in FIG. 3. As shown in FIG. 13, the secondary clamp housing 34 also includes three holes 37 through which three lateral pins 42 are inserted, as shown in FIG. 6. The lateral pins 42 serve to prevent the connected downcomer pipes 10 with the cracked weld from separating after the clamp assembly 30 is installed over them. Machined into primary and secondary clamp housings 32 and 34 are counterbored seating surfaces 39 surrounding holes 37.

Figure 16:
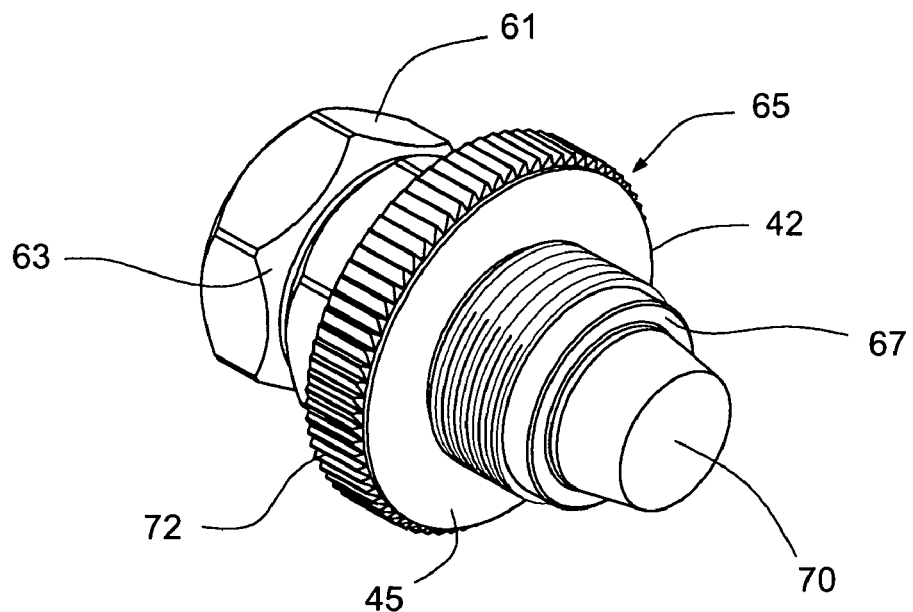
FIG. 16 is an isometric view of a lateral pin.

One embodiment of the lateral pin 42 is illustrated in FIG. 16. Preferably, the lateral pin 42 shown in FIG. 16 includes a hexagonal-shaped head 61 and a middle circular portion 65 with an enlarged diameter and a plurality of ratchet teeth 72 extending around the circumference of the middle circular portion 65. A "V" shaped groove 63 machined into the hexagonal head 61 of each of the lateral pins 42 is a tooling feature designed to facilitate holding of the lateral pin 42 for remote delivery of such bolts into a reactor during installation of clamp assembly 30 onto core spray line 10 piping. A similar "V" shaped groove 63 is machined into the hexagonal head 59 of the coupling bolts 38, and in a hexagonal midsection 57 of coupling bolt keeper nuts 40. Extending from a lower surface 45 of middle circular portion 65 is a threaded shaft 67 with a conical shaped end 70. Threaded shaft 67 facilitates the insertion of the lateral pin 42 into primary and secondary clamp housings 32 and 34.

Figure 17:
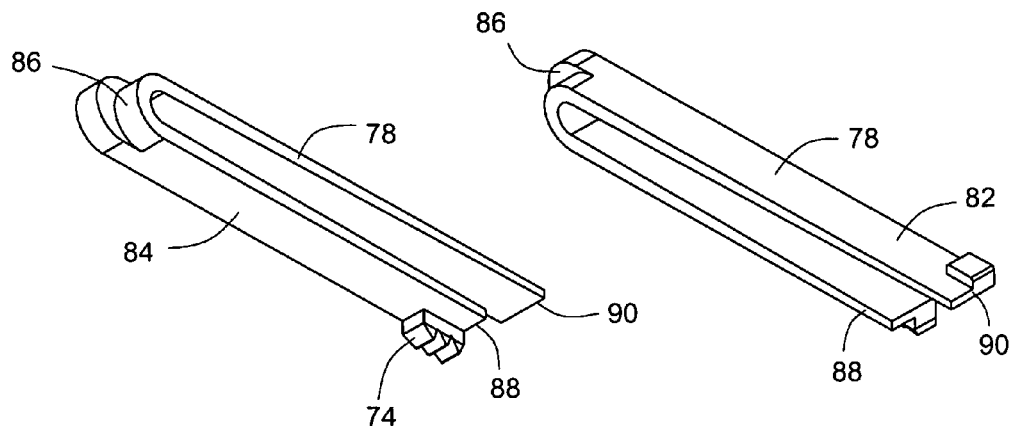
FIG. 17 is an isometric view of a lateral pin Keeper (Forward Facing Teeth).
Figure 18:
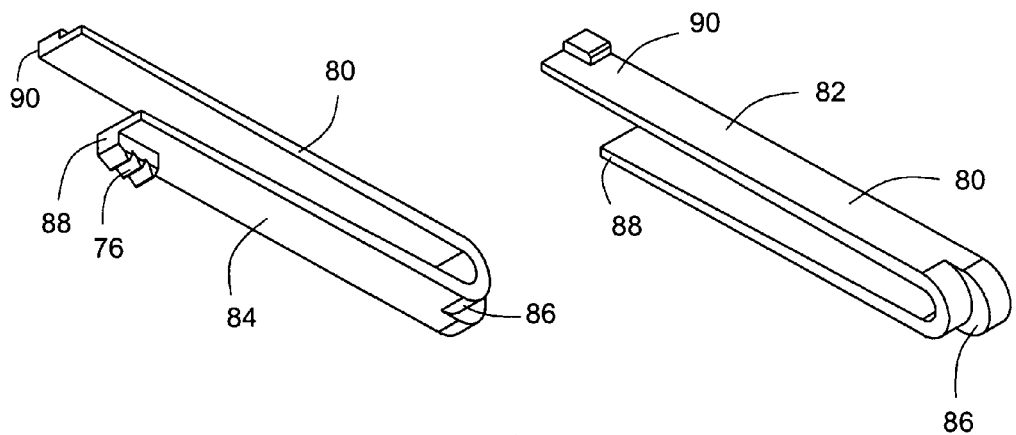
FIG. 18 is an isometric view of a lateral pin keeper (backward facing teeth).

The conically shaped distal ends 70 of lateral pins 42 are designed to seat into the conical EDM holes 44 in the downcomer piping 10. Additionally, the ratchet teeth 72 are designed to interface with corresponding teeth 74 and 76 of lateral pin keepers 78 and/or 80 shown in FIGS. 17 and 18. The lateral pin keepers shown in FIGS. 17 and 18 are mirrored or opposite hand parts, with exception of the orientation or facing direction of the respective ratchet teeth 74 and 76, i.e., forward facing versus backward facing. These lateral pin keepers 78 and 80 are designed to permit only clockwise rotation of the lateral pins 42, and thus prevent loss of mechanical preload when the clamp assembly 30 is subjected to flow induced vibration. For this purpose, ratchet teeth 74 and 76 of lateral pin keepers 78 and 80 engage the ratchet teeth 72 of lateral pins 42 to prevent rotational movement of lateral pins 42.

Primary clamp housing 32 preferably includes two lateral pin keepers 78 (FIG. 18), which are held captive in machined depressions 45 (FIG. 11) in the curved portion 33 of primary clamp housing 32. Secondary clamp housing 34 preferably includes three lateral pin keepers 78 and 80 (FIGS. 17 and 18), which are held captive in machined depressions 47 (FIG. 13) in the curved portion 35 of secondary clamp housing 34.

Primary clamp housing 32 also preferably has two lateral pins 42 (FIG. 3), which are threaded through lateral pin penetration holes 37 in the curved portion 33 of primary clamp housing 32 (FIG. 11). Secondary clamp housing 34 preferably has three lateral pins 42 (FIG. 6), which are threaded through lateral pin penetration holes 37 in the curved portion 35 of secondary clamp housing 34 (FIG. 13). The lateral pins 42 are maintained captive at these locations by interfacing with the lateral pin keepers 78 or 80. The function of the lateral pin keepers 78 and 80 is to permit only clockwise rotation of the lateral pins 42 once they have been fully threaded into curved portions 33 and 35 of primary and secondary clamp housings 32 and 34, to thereby retain lateral pin preload when subjected to flow induced vibration.

The lateral pins 42 are incorporated into the design of the clamp assembly 30 to provide a positive means of preventing pipe separation and the resultant uncontrolled leakage in the event of a weld failure. As can be seen from FIGS. 17 and 18, the lateral pin keepers 78 and 80 are preferably shaped like a hairpin, which consists of essentially two cantilever beams 82 and 84 joined at one end 86. There are retaining features at the free ends 88 and 90 of the first and second cantilever beams 82 and 84, and also at the common end 86 where both beams are joined together. In addition, the retaining feature at the end 88 of the first cantilever beam 84 also incorporate the teeth 74 or 76, which interface with the teeth 72 of the lateral pin 42 and function to prevent rotation of the lateral pin 42 in the direction that decreases bolt preload.

As shown in FIGS. 11 and 13, seating surfaces 39 surrounding lateral pin penetration holes 37 oppose, but do not contact, surfaces 45 on lateral pins 42 when such pins are threaded into lateral pin penetration holes 37 in primary and secondary clamp housings 32 and 34. Surfaces 45 do not contact seating surfaces 39 because, as lateral pins 42 are fully threaded into primary and secondary clamp housings 32 and 34, the conically shaped distal ends 70 of the lateral pins 42 seat into conical holes 44 machined in the downcomer piping 10.

Subsequent to installation of the lateral pins 42 and final application of torque to the coupling bolt keeper nuts 40, the crimp collars 56 of the clamp bolt keeper nuts 40 are crimped over the fluted ends 58 of the coupling bolts 38.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A damping device for supporting or structurally replacing a cracked weld joint between connected pipes, the clamping device comprising:
   a primary clamp housing,
   a secondary clamp housing,
   a hinge assembly rotationally joining together the primary and secondary clamp housings,
   at least one coupling bolt and at least one coupling bolt keeper nut joined together to connect the primary and secondary clamp housings together and thereby secure the primary and secondary clamp housings on opposite sides of the connected pipes in facing relation, the at least one coupling bolt extending through portions of the connected primary and secondary clamp housings not engaging the connected pipes,
   at least first and second lateral pins inserted into the primary and secondary clamp housings, respectively, the at least first and second lateral pins being seated in corresponding holes machined in the connected pipes, and
   at least first and second lateral pin keepers corresponding to the at least first and second lateral pins, the at least first and second lateral pin keepers being located on the primary and secondary clamp housings, respectively,
   a portion of each of the at least first and second lateral pins engaging a complementary portion of the at least first and second lateral pin keepers, respectively, so as to prevent rotation of the at least first and second lateral pins and thereby retain a preload on each of the at least first and second lateral pins.

2. The clamping device of claim 1, wherein each of the primary and secondary clamp housings include at least one contact pad and at least one bumper pad for interfacing with an outside surface of the connected pipes to which the primary and secondary clamp housings are applied, the at least one contact pad having a nominal radius of curvature relative to a nominal radius of curvature of the connected pipes that ensures that the clamping device engages the connected pipes in a stable manner.

3. A clamping device according to claim 2, wherein the primary clamp housing includes a plurality of bumper pads and a plurality of contact pads engaging the connected pipes, and wherein the secondary clamp housing includes a single bumper pad and a single contact pad engaging the connected pipes.

4. The clamping device of claim 1, wherein the hinge assembly is comprised of a plurality of hinge knuckles attached to the primary and secondary clamp housings and a hinge pin inserted through the plurality of hinge knuckles so as to rotationally attach the primary and secondary clamp housings together.

5. The clamping device of claim 1, wherein the at least one coupling bolt keeper nut is threaded over the at least one coupling bolt so as to cause the primary and secondary clamp housings to be clamped in position on the connected pipes by virtue of a mechanical tensile force imposed by the at least one coupling bolt being held in position through the primary and secondary clamp housings by the at least one coupling bolt keeper nut.

6. The clamping device of claim 5, wherein a plurality of coupling bolts connect the primary and secondary clamp housings together, and wherein a corresponding plurality of coupling bolt keeper nuts are threaded over the plurality of coupling bolts to secure the primary and secondary clamp housings on opposite sides of the connected pipes.

7. The clamping device of claim 5, wherein the portions of the primary and secondary clamp housings comprise primary and secondary extensions, respectively, that include holes for receiving the at least one coupling bolt and spherical seating surfaces surrounding the holes that mate with either at least one complementary-shaped spherical head of the at least one coupling bolt or at least one complimentary-shaped spherical nut that is part of the at least one coupling bolt keeper nut.

8. The clamping device of claim 1, wherein a distal end of the at least one coupling bolt is machined to an outside diameter slightly smaller than an inside diameter of a crimp collar of the at least one coupling bolt keeper nut and is machined with a plurality of flutes to facilitate crimping of the at least one coupling bolt keeper nut crimp collar onto the distal end of the at least one coupling bolt.

9. The clamping device of claim 8, wherein the at least one coupling bolt keeper nut crimp collar has a wall thickness that facilitates crimping of the at least one coupling bolt keeper nut crimp collar onto the distal end of the at least one coupling bolt.

10. The clamping device of claim 1, wherein a lower portion of the connected pipes has a first lateral pin and a second lateral pin seated in corresponding holes in the lower portion, and wherein an upper portion of the connected pipe has a first lateral pin and two second lateral pins seated in corresponding holes in the upper portion.

11. The clamping device of claim 1, wherein the first and second lateral pin keepers are each shaped like a hairpin consisting of two cantilever beams joined at one end, and wherein the complementary portions of the first and second lateral pin keepers are each a plurality of teeth at the distal end of a respective one of the two cantilevered beams, each of the pluralities of teeth engaging a corresponding plurality of ratchet teeth on a mid portion of the corresponding one of the first and second lateral pins.

12. A clamping device according to claim 11, wherein curved portions of the primary and secondary clamp housings each includes at least one hole through which the corresponding one of the first and second lateral pins is inserted, each of the at least one hole including a seating surface that opposes, but is not contacted by, a lower surface of the mid portion of the corresponding lateral pin when the corresponding lateral pin is fully inserted into the hole, each of the lateral pins having a conically shaped distal end that seats into a corresponding conically shaped hole machined in the connected pipes so as to preclude the seating surface and the lower surface from contacting one another.

13. A clamping device according to claim 11, wherein each of the pluralities of ratchet teeth extend around a perimeter of the mid section of the corresponding one of the first and second lateral pins, the ratchet teeth engaging the corresponding teeth on the corresponding one of the first and second lateral pin keepers when the corresponding lateral pin keeper is received in at least one slot depression located on the primary or secondary clamp housing in which the corresponding lateral pin keeper is located, the corresponding teeth and ratchet teeth being configured to limit rotation of the corresponding one of the lateral pins in a direction that decreases the preload on the corresponding one of the lateral pins.

14. A clamping device according to claim 13, wherein the corresponding one of the lateral pins includes a hexagonal-shaped head and a "V" shaped groove machined into the hexagonal head that is a tooling feature designed to facilitate holding of the at least one lateral pin for remote delivery of the corresponding one of the lateral pins into a reactor during installation of the clamping device onto the connected pipes.

15. A clamping device for supporting or structurally replacing a cracked weld between connected pipes in a core spray line in a boiling water nuclear reactor, the clamping device comprising:

a primary clamp housing including a first curved portion, a secondary clamp housing including a second curved portion, a hinge assembly rotationally joining together the primary and secondary clamp housings, at least one coupling bolt and at least one coupling bolt keeper nut connecting the primary and secondary clamp housings together so as to secure the primary and secondary clamp housings on opposite sides of the spray line connected pipes in facing relation, the at least one coupling bolt extending through extensions of the connected primary and secondary clamp housings, at least one first lateral pin inserted into the first curved portion of the primary clamp housing, a distal end of the at least one first lateral pin seating into a first hole machined in the spray line connected pipes, at least one first lateral pin keeper positioned on the primary clamp housing engaging the at least one first lateral pin, at least one second lateral pin inserted into the second curved portion of the secondary clamp housing, a distal end of the at least one second lateral pin seating into a second hole machined in the spray line connected pipes, and at least one second lateral pin keeper positioned on the secondary clamp housing engaging the at least one second lateral pin, the first and second lateral pins each including ratchet teeth that interface with corresponding teeth of the first and second lateral pin keepers, respectively, to prevent rotation of the first and second lateral pins to thereby retain preloads on the first and second lateral pins.

16. The clamping device of claim 15, wherein each of the primary and secondary clamp housings includes at least one contact pad and at least one bumper pad for interfacing with an outside surface of the connected pipes to which the primary and secondary clamp housings are applied, the nominal radius of curvature of the at least one contact pad relative to a nominal radius of curvature of the connected pipes ensuring that the clamping device engages the connected pipes in a stable manner.

17. The clamping device of claim 15, wherein a distal end of the at least one coupling bolt is machined to an outside diameter slightly smaller than an inside diameter of a cylindrical thin-walled crimp collar of the at least one coupling bolt keeper nut and is machined with a plurality of flutes to facilitate crimping of the crimp collar onto the distal end of the at least one coupling bolt.

18. The clamping device of claim 15, wherein a lower portion of the connected pipes has a first lateral pin and a second lateral pin seated in corresponding holes in the lower portion, and wherein an upper portion of the connected pipes has a first lateral pin and two second lateral pins seated in corresponding holes in the upper portion.

19. The clamping device of claim 15, wherein the first and second lateral pin keepers are each shaped like a hairpin consisting of two cantilever beams joined at one end, one of the two cantilevered beams of each of the first and second lateral pin keepers having a distal end including teeth that interface with ratchet teeth on the corresponding first or second lateral pins.

* * * * *

UNITED STATES PATENT AND TRADEMARK OFFICE
CERTIFICATE OF CORRECTION

| | | |
|---|---|---|
| PATENT NO. | : 8,038,174 B2 | Page 1 of 1 |
| APPLICATION NO. | : 12/222427 | |
| DATED | : October 18, 2011 | |
| INVENTOR(S) | : Jensen | |

It is certified that error appears in the above-identified patent and that said Letters Patent is hereby corrected as shown below:

In the Claims:

Claim 1, column 7, line 13, delete "A damping device" and insert -- A clamping device --

Signed and Sealed this
Tenth Day of January, 2012

David J. Kappos
*Director of the United States Patent and Trademark Office*